United States Patent
Pasquale et al.

(10) Patent No.: US 11,301,370 B2
(45) Date of Patent: Apr. 12, 2022

(54) PARALLEL OVERLAP MANAGEMENT FOR COMMANDS WITH OVERLAPPING RANGES

(71) Applicant: Samsung Electronics Co., Ltd., Suwon-si (KR)

(72) Inventors: Chase Pasquale, San Jose, CA (US); Richard N. Deglin, Monterey, CA (US); Ajith Mohan, Idukki District (IN); Srinivasa Raju Nadakuditi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 16/839,900

(22) Filed: Apr. 3, 2020

(65) Prior Publication Data

US 2021/0303457 A1  Sep. 30, 2021

Related U.S. Application Data

(60) Provisional application No. 62/994,185, filed on Mar. 24, 2020.

(51) Int. Cl.
| | |
|---|---|
| *G06F 3/06* | (2006.01) |
| *G06F 12/02* | (2006.01) |
| *G06F 9/48* | (2006.01) |
| *G06F 11/30* | (2006.01) |

(52) U.S. Cl.
CPC .......... *G06F 12/0246* (2013.01); *G06F 3/061* (2013.01); *G06F 3/064* (2013.01); *G06F 3/0673* (2013.01); *G06F 9/4843* (2013.01); *G06F 11/3037* (2013.01); *G06F 12/0292* (2013.01)

(58) Field of Classification Search
None
See application file for complete search history.

(56) References Cited

U.S. PATENT DOCUMENTS

| | | | | |
|---|---|---|---|---|
| 5,548,795 | A  * | 8/1996 | Au ........................ | G06F 3/0601 710/3 |
| 6,490,635 | B1 * | 12/2002 | Holmes ................. | G06F 3/0605 710/15 |
| 10,922,022 | B2 * | 2/2021 | Singh ...................... | G06F 3/064 |
| 2011/0161552 | A1 * | 6/2011 | Lund .................... | G06F 12/0246 711/103 |
| 2011/0208915 | A1 | 8/2011 | Bannon et al. | |
| 2013/0166855 | A1 | 6/2013 | Batwara et al. | |
| 2013/0223628 | A1 * | 8/2013 | Cho ........................ | G06F 21/72 380/277 |
| 2014/0136799 | A1 | 5/2014 | Fortin | |

(Continued)

*Primary Examiner* — Nathan Sadler
(74) *Attorney, Agent, or Firm* — Lewis Roca Rothgerber Christie LLP

(57) ABSTRACT

A storage device includes: one or more logical blocks to store host data received from a host device, the logical blocks having a logical block address (LBA); an LBA range table to store one or more LBA ranges associated with one or more commands received from the host device over a storage interface; and an overlap check circuit to compare an LBA range associated with an active request with the one or more LBA ranges associated with the one or more commands, and to determine an overlap between the LBA range associated with the active request and any of the one or more LBA ranges associated with the one or more commands

18 Claims, 7 Drawing Sheets

(56) References Cited

U.S. PATENT DOCUMENTS

| | | |
|---|---|---|
| 2015/0032936 A1* | 1/2015 | Yu .................... G06F 3/0671 |
| | | 711/103 |
| 2015/0113224 A1 | 4/2015 | Achilles et al. |
| 2015/0253992 A1* | 9/2015 | Ishiguro ............... G06F 3/0679 |
| | | 711/103 |
| 2016/0110296 A1* | 4/2016 | Bao .................... G06F 12/1483 |
| | | 711/102 |
| 2016/0342545 A1 | 11/2016 | Arai et al. |
| 2017/0083314 A1 | 3/2017 | Burger et al. |
| 2017/0123995 A1 | 5/2017 | Freyensee et al. |
| 2019/0384719 A1 | 12/2019 | Lappi et al. |

* cited by examiner

PARALLEL OVERLAP MANAGEMENT FOR COMMANDS WITH OVERLAPPING RANGES

CROSS-REFERENCE TO RELATED APPLICATION(S)

This application claims priority to and the benefit of U.S. Provisional Application No. 62/994,185, filed on Mar. 24, 2020, entitled "PARALLEL OVERLAP MANAGEMENT FOR COMMANDS WITH OVERLAPPING RANGES," the entire content of which is incorporated by reference herein.

FIELD

Aspects of one or more example embodiments of the present disclosure relate to storage devices, and more particularly, to a storage device for managing commands with overlapping ranges.

BACKGROUND

A storage system generally includes a host device and one or more storage devices. The host device may manage data stored in the storage device by transmitting various commands to the storage device to update one or more logical blocks of the storage device. For example, the host device may transmit an UNMAP command or a REASSIGN BLOCKS command to the storage device, along with one or more logical block addresses (LBAs) or LBA ranges, such that the storage device reclaims (e.g., UNMAP) or changes a physical location of (e.g., REASSIGN BLOCKS) the logical blocks associated with the one or more LBAs or LBA ranges. In this case, the storage device may block other commands, for example, such as READ and WRITE commands, which have one or more overlapping LBAs or LBA ranges with either an UNMAP command or a REASSIGN BLOCKS command (or may similarly block REASSIGN BLOCKS or UNMAP commands with overlapping LBAs or LBA ranges), to maintain atomicity within the affected LBAs or LBA ranges.

The above information disclosed in this Background section is for enhancement of understanding of the background of the present disclosure, and therefore, it may contain information that does not constitute prior art.

SUMMARY

One or more example embodiments of the present disclosure are directed to a storage device including a hardware module (e.g., an LOC circuit) for checking overlap of commands with multiple disjoint LBAs or LBA ranges.

One or more example embodiments of the present disclosure are directed to a storage device including a hardware module (e.g., an LOC circuit) to enable execution of a command with non-overlapping LBAs or LBA ranges, even when one or more LBAs or LBA ranges for the same command are blocked by an overlap.

According to one or more example embodiments of the present disclosure, a storage device includes: one or more logical blocks configured to store host data received from a host device, the logical blocks having a logical block address (LBA); an LBA range table configured to store one or more LBA ranges associated with one or more commands received from the host device over a storage interface; and an overlap check circuit configured to compare an LBA range associated with an active request with the one or more LBA ranges associated with the one or more commands, and to determine an overlap between the LBA range associated with the active request and any of the one or more LBA ranges associated with the one or more commands.

In an example embodiment, the overlap check circuit may be configured to block execution of a command associated with the active request in response to determining that the LBA range associated with the active request overlaps with at least one of the one or more LBA ranges associated with the one or more commands, and to allow execution of the command associated with the active request in response to determining that the LBA range associated with the active request does not overlap with any of the one or more LBA ranges associated with the one or more commands.

In an example embodiment, the one or more commands may correspond to a pending command that is blocked by the overlap check circuit for having an overlapping LBA range, or that is in-progress of being executed.

In an example embodiment, the active request may correspond to an incoming command received from the host device over the storage interface, and the LBA range associated with the active request may include disjoint LBA ranges of the incoming command.

In an example embodiment, the overlap check circuit may be configured to block execution of the incoming command for at least a first LBA range from among the disjoint LBA ranges, and to allow execution of the incoming command for at least a second LBA range from among the disjoint LBA ranges for the same incoming command.

In an example embodiment, the overlap check circuit may include one or more comparators configured to compare the LBA range associated with the active request with the one or more LBA ranges associated with the one or more commands, and each of the comparators may be configured to compare the LBA range associated with the active request with a different one of the one or more LBA ranges associated with the one or more commands.

In an example embodiment, the overlap check circuit may be configured to maintain an execution order sequence of commands having overlapping LBA ranges.

In an example embodiment, the overlap check circuit may be configured to set an overlap count value for the LBA range associated with the active request in response to determining that the LBA range associated with the active request overlaps with at least one of the one or more LBA ranges associated with the one or more commands, and the overlap count value may correspond to a number of overlaps between the LBA range associated with the active request and the one or more LBA ranges associated with the one or more commands.

In an example embodiment, the overlap check circuit may be configured to decrement the overlap count value in response to an execution completion of a command from among the one or more commands having an overlapping LBA range with the LBA range associated with the active request, and to allow execution of the LBA range associated with the active request in response to the overlap count value being decremented to a threshold.

In an example embodiment, the LBA range associated with the active request may be registered to the LBA range table, and the overlap check circuit may be configured to retrieve the LBA range associated with the active request from the LBA range table.

According to one or more example embodiments of the present disclosure, a method for checking overlaps in a logical block address (LBA) associated with a command issued by a host device to a storage device, includes: storing, by an LBA range table, one or more LBA ranges associated with one or more commands received from the host device over a storage interface; comparing, by an overlap check circuit of the storage device, an LBA range associated with an active request with the one or more LBA ranges associated with the one or more commands; and determining, by the overlap check circuit, an overlap between the LBA range associated with the active request and any of the one or more LBA ranges associated with the one or more commands.

In an example embodiment, the method may further include: blocking, by the overlap check circuit, execution of a command associated with the active request in response to determining that the LBA range associated with the active request overlaps with at least one of the one or more LBA ranges associated with the one or more commands; and allowing, by the overlap check circuit, execution of the command associated with the active request in response to determining that the LBA range associated with the active request does not overlap with any of the one or more LBA ranges associated with the one or more commands.

In an example embodiment, the one or more commands may correspond to a pending command that is blocked by the overlap check circuit for having an overlapping LBA range, or that is in-progress of being executed.

In an example embodiment, the active request may correspond to an incoming command received from the host device over the storage interface, and the LBA range associated with the active request may include disjoint LBA ranges of the incoming command.

In an example embodiment, the method may further include: blocking, by the overlap check circuit, execution of the incoming command for at least a first LBA range from among the disjoint LBA ranges; and allowing, by the overlap check circuit, execution of the incoming command for at least a second LBA range from among the disjoint LBA ranges for the same incoming command.

In an example embodiment, the overlap check circuit may include one or more comparators, and the method may further include: comparing, by the comparators, the LBA range associated with the active request with the one or more LBA ranges associated with the one or more commands, and each of the comparators may compare the LBA range associated with the active request with a different one of the one or more LBA ranges associated with the one or more commands.

In an example embodiment, the method may further include: maintaining, by the overlap check circuit, an execution order sequence of commands having overlapping LBA ranges.

In an example embodiment, to maintain the execution order sequence, the method may further include: setting, by the overlap check circuit, an overlap count value for the LBA range associated with the active request in response to determining that the LBA range associated with the active request overlaps with at least one of the one or more LBA ranges associated with the one or more commands, and the overlap count value may correspond to a number of overlaps between the LBA range associated with the active request and the one or more LBA ranges associated with the one or more commands.

In an example embodiment, the method may further include: decrementing, by the overlap check circuit, the overlap count value in response to an execution completion of a command from among the one or more commands having an overlapping LBA range with the LBA range associated with the active request; and allowing, by the overlap check circuit, execution of the LBA range associated with the active request in response to the overlap count value being decremented to a threshold.

In an example embodiment, the LBA range associated with the active request may be registered to the LBA range table, and the method may further include: retrieving, by the overlap check circuit, the LBA range associated with the active request from the LBA range table.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
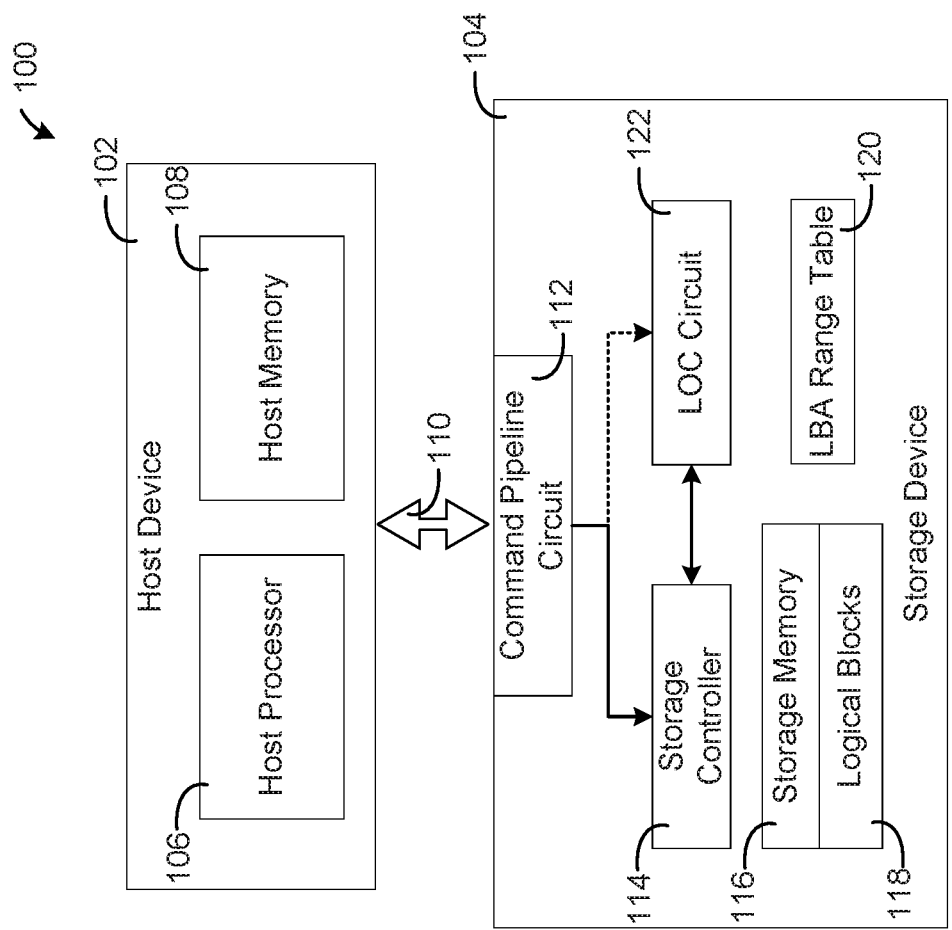
FIG. 1 is a system diagram of a storage system, according to one or more example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

According to one or more example embodiments of the present disclosure, a host device (e.g., a host computer) may issue commands to a storage device to request an update to one or more logical blocks of the storage device storing host data. In this case, each command may provide a list of one or more logical block addresses (LBAs) or LBA ranges that are associated with the command to the storage device. For example, an UNMAP command (e.g., a SCSI UNMAP command) may provide a list of LBAs to the storage device, and a REASSIGN BLOCKS command (e.g., a SCSI REASSIGN BLOCKS command) may provide a list of LBA ranges to the storage device. The storage device may block other commands, for example, such as READ and WRITE commands, which have an LBA overlap with either a REASSIGN BLOCKS command or an UNMAP command (and/or may similarly block REASSIGN BLOCKS or UNMAP commands with overlapping LBAs or LBA ranges), to maintain atomicity within the affected LBAs or LBA ranges. However, this may present a performance problem.

For example, a comparative storage device may check for overlaps in LBAs or LBA ranges sequentially, such that the comparative storage device may handle one LBA or LBA range at a time. In this case, however, the comparative storage device may block all subsequent commands until the commands with overlapping ranges are resolved (e.g., processed and/or executed), even if the subsequent commands do not have overlapping LBAs or LBA ranges. This may degrade performance of the storage device, because rather than allowing commands with non-overlapping LBAs or LBA ranges to be executed (e.g., executed immediately), these commands may be blocked until any previous commands having overlapping LBAs or LBA ranges have been resolved and executed. Similarly, for a command (e.g., a single command) having multiple disjoint LBAs or LBA ranges, the comparative storage device may check for overlaps in the LBAs or LBA ranges sequentially, such that an overlap for a first LBA or LBA range from among the multiple disjoint LBAs or LBA ranges may prevent the comparative storage device from processing a second LBA or LBA range from among the multiple disjoint LBAs or LBA ranges, even if there is no overlap affecting the second LBA or LBA range.

According to one or more example embodiments of the present disclosure, a storage device may include a hardware module (e.g., an LOC circuit) to support overlap checking of multiple LBAs or LBA ranges concurrently (e.g., simultaneously or at the same time). In this case, the hardware module may block execution of commands having overlapping LBAs or LBA ranges, while allowing execution of commands (e.g., subsequent commands) that do not have overlapping LBAs or LBA ranges, even if one or more previous commands are blocked for having overlapping LBAs or LBA ranges. Accordingly, performance of the storage device may be improved.

According to one or more example embodiments of the present disclosure, the hardware module (e.g., the LOC circuit) may check for overlaps in multiple disjoint LBAs or LBA ranges concurrently for a single command. For example, LBAs or LBA ranges for the single command may be divided into multiple entries of an LBA range table, which may be used by the hardware module to check for overlaps with those of pending commands (e.g., commands being executed or waiting to be executed). In some embodiments, any LBAs or LBA ranges of the command that overlap with one or more of those of the pending commands may be blocked, while those of the same command that do not overlap with those of the pending command may be allowed to be executed (e.g., may be executed immediately or may proceed to be executed). In some embodiments, any received commands that overlap the LBAs or LBA ranges of in-progress commands may be automatically blocked until the ranges are fully processed. Accordingly, performance may be improved.

According to one or more example embodiments of the present disclosure, the hardware module (e.g., the LOC circuit) may offload the overlap check from firmware or software. For example, checking for overlap in multiple disjoint LBAs or LBA ranges using firmware or software (e.g., a processor executing instructions) may introduce latency (e.g., due to a processing time), and/or may reduce throughput (e.g., overall throughput) of the storage device (e.g., by utilizing limited processing resources of the storage device). Accordingly, by offloading the overlap check to the hardware module, latency may be reduced, and/or throughput of the storage device 104 may be improved.

FIG. 1 is a system diagram of a storage system, according to one or more example embodiments of the present disclosure.

In brief overview, the storage system 100, according to one or more embodiments of the present disclosure, may include a host device (e.g., a host computer) 102 and a storage device 104. The host device 102 may issue commands to the storage device 104, such that the storage device 104 manages host data stored therein according to the commands. For example, the host device 102 may be communicably connected to the storage device 104 (e.g., over a storage interface 110), and may issue various commands (e.g., READ, WRITE, UNMAP, REASSIGN BLOCKS, TRIM, and/or the like) to the storage device 104, along with one or more LBAs or LBA ranges associated with the commands. The storage device 104 may store, update, and/or otherwise manage host data in one or more logical blocks associated with the one or more LBAs or LBA ranges. Once a command is executed, the storage device 104 may transmit a response to the host device 102, indicating that the command was successfully completed.

In one or more example embodiments, the storage device 104 may include a hardware module (e.g., an LOC circuit 122) to check for overlaps between one or more LBAs or LBA ranges associated with an incoming command and those of pending commands, rather than using firmware or software (e.g., a processor executing instructions, such as a storage controller 114) to perform the overlap checks. For example, in some embodiments, the LBAs or LBA ranges associated with one or more pending commands (e.g., one or more commands in-progress of being executed or waiting to be executed) may be divided into individual entries of a table (e.g., an LBA range table 120). In this case, the hardware module may compare one or more LBAs or LBA ranges associated with an incoming command with those in the table, to determine whether the one or more LBAs or LBA ranges associated with the incoming command overlap with those from the table. If the one or more LBAs or LBA ranges associated with the incoming command overlap with those from the table, the incoming command may be blocked. On the other hand, if the one or more LBAs or LBA ranges associated with the incoming command do not overlap with any of those from the table, the incoming command may be executed (e.g., may be immediately executed or may proceed to be executed).

In one or more example embodiments, the hardware module (e.g., the LOC circuit 122) may concurrently (e.g., simultaneously or at the same time) check multiple disjoint LBAs or LBA ranges associated with a command (e.g., a single command), and may enable execution of the command for non-overlapping ones of the LBAs or LBA ranges, while blocking execution of the same command for overlapping ones of the LBAs or LBA ranges. Accordingly, by allowing execution of the command for the non-overlapping LBAs or LBA ranges while concurrently blocking the execution of the same command for the overlapping LBAs or LBA ranges, execution time of the commands may be reduced or minimized.

In more detail, referring to FIG. 1, the host device 102 may include the host processor 106 and the host memory 108. The host processor 106 may be a general purpose processor, for example, such as a central processing unit (CPU) core of the host device 102. The host memory 108 may be considered as high performing main memory (e.g., primary memory) of the host device 102. For example, in some embodiments, the host memory 108 may include (or may be) volatile memory, for example, such as dynamic random-access memory (DRAM). However, the present disclosure is not limited thereto, and the host memory 108 may include (or may be) any suitable high performing main memory (e.g., primary memory) replacement for the host device 102 as would be known to those skilled in the art. For example, in other embodiments, the host memory 108 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (Re-RAM) and can include, for example, chalcogenides, and/or the like.

The storage device 104 may be considered as secondary memory that may persistently store data accessible by the host device 102. In this context, the storage device 104 may include (or may be) relatively slower memory when compared to the high performing memory of the host memory 108. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 104 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 104 may conform to any suitable or desired derivative of these form factors. For convenience, the storage device 104 may be described hereinafter in the context of an SSD, but the present disclosure is not limited thereto.

The storage device 104 may be communicably connected to the host device 102 over a storage interface 110. The storage interface 110 may facilitate communications (e.g., using a connector and a protocol) between the host device 102 and the storage device 104. In some embodiments, the storage interface 110 may facilitate the exchange of storage requests and responses between the host device 102 and the storage device 104. For example, in an embodiment, the storage interface 110 (e.g., the connector and the protocol thereof) may include (or may conform to) Small Computer System Interface (SCSI), Non Volatile Memory Express (NVMe), and/or the like. However, the present disclosure is not limited thereto, and in other embodiments, the storage interface 110 (e.g., the connector and protocol thereof) may conform to other suitable storage interfaces, for example, such as Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVME-oF), and/or the like. In other embodiments, the storage interface 110 (e.g., the connector and the protocol thereof) may include (or may conform to) various general-purpose interfaces, for example, such as Ethernet, Universal Serial Bus (USB), and/or the like. For convenience, the storage interface 110 may be described hereinafter in the context of a SCSI interface, but the present disclosure is not limited thereto.

In some embodiments, the storage device 104 may include a storage controller 114, and storage memory 116. The storage controller 114 may be connected to the storage interface 110 (e.g., via a command pipeline circuit 112), and may respond to input/output (I/O) requests received from the host device 102 over the storage interface 110. The storage controller 114 may provide an interface to control, and to provide access to and from, the storage memory 116. For example, the storage controller 114 may include at least one processing circuit embedded thereon for interfacing with the host device 102 and the storage memory 116. The processing circuit may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 116 according to the data access instructions. For example, the data access instructions may include any suitable data storage and retrieval algorithm (e.g., READ/WRITE) instructions, data management and update algorithm (e.g., UNMAP, REASSIGN BLOCKS, TRIM, and/or the like) instructions, and/or the like.

The storage memory 116 may persistently store the data received from the host device 102. For example, the storage memory 116 may include a plurality of logical blocks 118 to store host data received from the host device 102. In an embodiment, the storage memory 116 may include non-volatile memory, for example, such as NAND flash memory. However, the present disclosure is not limited thereto, and the storage memory 116 may include any suitable memory depending on a type of the storage device 104.

In one or more example embodiments, the storage device 104 may include an LBA range table 120. The LBA range table 120 may include a plurality of individual slots storing the LBAs or LBA ranges associated with one or more commands that are in-progress of being executed or waiting to be executed, such that the LBAs or LBA ranges in the LBA range table 120 may be compared with that of an incoming command. For example, in some embodiments, the LBA range table 120 may be stored in a buffer or in volatile memory of the storage device 104, such as DRAM. However, the present disclosure is not limited thereto, and the LBA range table 120 may be stored in any suitable memory such that the LBAs or LBA ranges in the LBA range table 120 may be retrieved and compared with those of incoming commands. For example, in another embodiment, the LBA range table 120 may be stored in the storage memory 116.

In one or more example embodiments, the storage device 104 may further include a command pipeline circuit 112 and an LBA overlap check (LOC) circuit 122. In some embodiments, the command pipeline circuit 112 may receive commands (e.g., command frames, submission queue entries, and/or the like) from the host device 102 over the storage interface 110, and may post (e.g., may transmit) the commands (e.g., via notifications) to the storage controller 114 (or another processor using firmware or software). In this case, the storage controller 114 (or another processor using firmware or software) may submit one or more LBA ranges associated with each of the commands to the LOC circuit 122 for overlap checking. In some embodiments, the command pipeline circuit 112 may receive commands (e.g., command frames, submission queue entries, and/or the like) from the host device 102, and may parse the commands (e.g., to determine a command type of each of the commands, and one or more LBAs or LBA ranges associated with each of the commands). In this case, in some embodiments, the command pipeline circuit 112 may submit one or more LBAs or LBA ranges associated with each of the commands to the LOC circuit 122 for overlap checking. In some embodiments, each of the command pipeline circuit 112 and the storage controller 114 (or another processor using firmware or software) may submit the LBAs or LBA ranges to the LOC circuit 122 for overlap checking. In other embodiments, a suitable one from among the command pipeline circuit 112 and the storage controller 114 (or another processor using firmware or software) may submit the LBAs or LBA ranges to the LOC circuit 122 for overlap checking depending on an implementation or a type of the storage device 104. However, the present disclosure is not limited thereto, and one from among the command pipeline circuit 112 and the storage controller 114 may be omitted depending on a type and/or an implementation of the storage device 104.

In some embodiments, the LOC circuit 122 may be implemented as a hardware module (e.g., an electronic circuit) that is communicably connected to the storage controller 114 and/or the command pipeline circuit 112, and may receive overlap check requests from the storage controller 114 and/or the command pipeline circuit 112. The LOC circuit 122 may check for overlaps between one or more LBAs or LBA ranges associated with the overlap check request and one or more LBAs or LBA ranges from the LBA range table 120. For example, in an embodiment, the LOC circuit 122 may be implemented as an integrated circuit (IC) that is attached to (or mounted on) the storage device 104 (e.g., that may be embedded on the same board or the same circuit board as that of the storage device 104). For example, the LOC circuit 122 may be implemented on (e.g., may be attached to or mounted on) the storage device 104 as a system on chip (SOC). However, the present disclosure is not limited thereto. For example, in another embodiment, the LOC circuit 122 may be implemented on a separate circuit board (e.g., a printed circuit board PCB) from that of the storage device 104, and may be connected to the storage controller 114 and/or the command pipeline circuit 112.

In one or more example embodiments, as discussed in more detail below with reference to FIGS. 2-7, the LOC circuit 122 may receive requests from the storage controller 114 and/or the command pipeline circuit 112 to check for overlaps in multiple LBAs or LBA ranges concurrently (e.g., simultaneously or at the same time). For example, the storage controller 114 and/or the command pipeline circuit 112 may register LBAs or LBA ranges (which may be collectively referred to hereinafter as LBA ranges) for incoming commands into individual slots of the LBA range table 120, and the LOC circuit 122 may use the LBA range table 120 to concurrently check for overlaps between one or more LBA ranges in the request and those in the LBA range table 120. In some embodiments, the LOC circuit 122 may block execution of any commands having LBA ranges that overlap with one or more of those in the LBA range table 120, and may allow execution of commands having LBA ranges that do not overlap with those in the LBA range table 120. In some embodiments, the LOC circuit 122 may enable execution of a command for non-overlapping ones of the LBA ranges, while blocking execution of the same command for overlapping ones of the LBA ranges. Accordingly, execution time of the commands may be reduced or minimized, latency may be reduced, and/or throughput may be improved.

Figure 2:
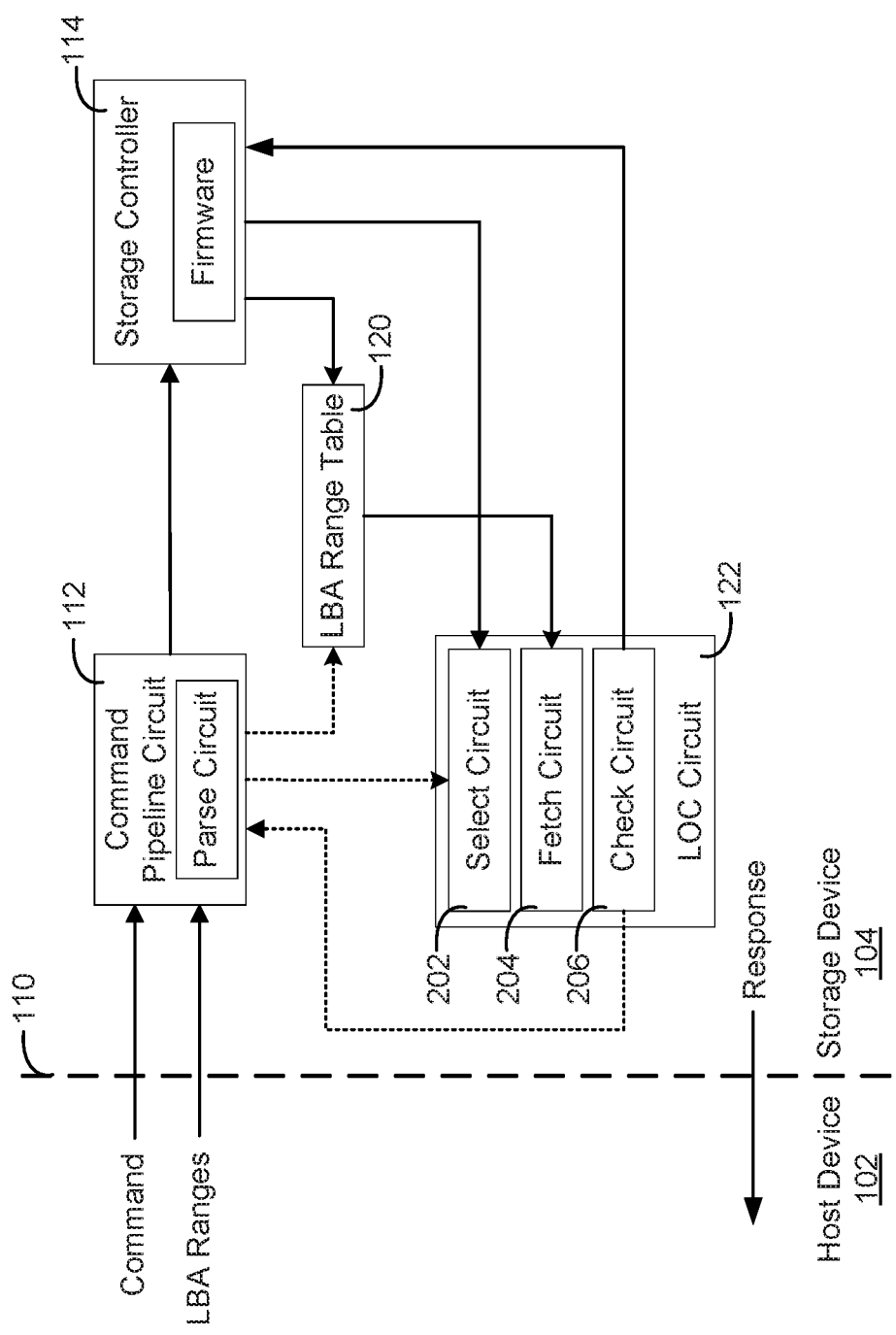
FIG. 2 is a block diagram illustrating an LOC circuit of a storage device, according to one or more example embodiments of the present disclosure.

FIG. 2 is a block diagram illustrating an LOC circuit of a storage device, according to one or more example embodiments of the present disclosure.

In brief overview, the LOC circuit 122 may be a hardware module (e.g., an electronic circuit) that is connected to the storage controller 114 (e.g., as shown by solid line arrows) and/or the command pipeline circuit 112 (e.g., as shown by dotted line arrows), such that the LOC circuit 122 may receive overlap check requests from the storage controller 114 and/or the command pipeline circuit 112. In some embodiments, the LOC circuit 122 may select an overlap check request from among the overlap check requests as an active request, and may fetch (e.g., may retrieve or may read) one or more LBA ranges associated with the active request from the LBA range table 120 into an internal table (e.g., an internal register of flip flops). The LOC circuit 122 may compare the one or more LBA ranges associated with the active request with other LBA ranges in the internal table associated with other pending commands (e.g., commands in progress or waiting to be executed). The LOC circuit 122 may determine an overlap between the LBA ranges according to a comparison result. In some embodiments, the LOC circuit 122 may generate an overlap count, which may be used to maintain an execution order sequence of the commands having overlapping LBA ranges. For example, in some embodiments, the LOC circuit 122 may include a select circuit 202, a fetch circuit 204, and a check circuit 206.

In more detail, referring to FIG. 2, in some embodiments, the command pipeline circuit 112 may receive an incoming command (e.g., a command frame, a submission queue entry, and/or the like), for example, such as an UNMAP command (e.g., a SCSI UNMAP command) or a REASSIGN BLOCKS command (e.g., a SCSI REASSIGN BLOCKS command), from the host device 102 over the storage interface 110. The incoming command may include one or more LBA ranges associated with the command, such that the storage device 104 executes an operation associated with the command on one or more logical blocks 118 corresponding to the one or more LBA ranges. In some embodiments, the command pipeline circuit 112 may post (e.g., may transmit) the command (e.g., via a notification) to the storage controller 114, such that the storage controller 114 may process the command using, for example, firmware or software. In this case, the storage controller 114 may update the LBA range table 120 in the storage memory 116 according to the command and one or more LBA ranges associated with the command. In another embodiment, the command pipeline circuit 112 may include a parse circuit to parse the command (e.g., to determine a type of the command and one or more LBA ranges associated with the command). In this case, the command pipeline circuit 112 may update the LBA range table 120 in the storage memory 116 according to the command and one or more LBA ranges associated with the command. In another embodiment, each of the command pipeline circuit 112 and the storage controller 114 may update the LBA range table 120 in the storage memory 116 with the LBA ranges associated with the incoming commands. In some embodiments, the command pipeline circuit 112 and/or the storage controller 114 may divide a single command having multiple disjoint LBA ranges into individual entries of the LBA range table 120.

Figure 3:
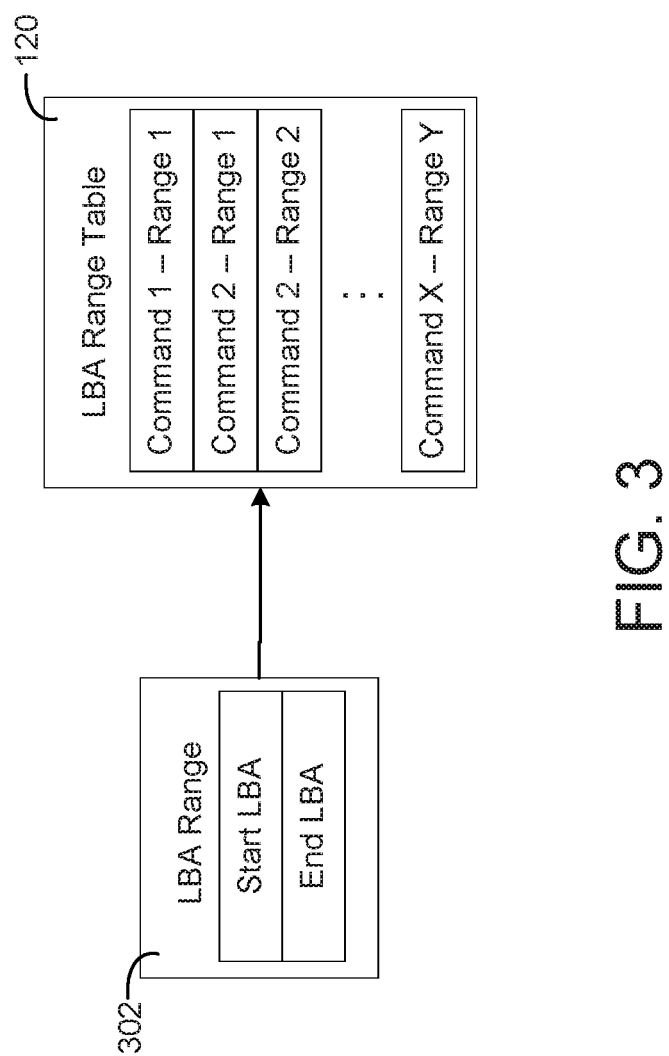
FIG. 3 illustrates an example format of an LBA range table, according to one or more example embodiments of the present disclosure.

For example, FIG. 3 illustrates an example format of an LBA range table, according to one or more example embodiments of the present disclosure. As shown in FIG. 3, the LBA range table 120 may include a plurality of entries (e.g., a plurality of individual slots), each entry corresponding to a command and an LBA range associated with the command. The LBA range table 120 may be updated by the command pipeline circuit 112 and/or the storage controller 114 by providing an LBA range 302 for an incoming command to the LBA range table 120. For example, the LBA range 302 for the incoming command may define a start LBA and an end LBA of the LBA range. In another example, the LBA range 302 for the incoming command may define a start LBA and an LBA count. However, the present disclosure is not limited thereto. For example, when the LBA range includes a single LBA, the LBA range 302 may include the single LBA (e.g., instead of the start LBA and the end LBA), or the start LBA and the end LBA may include the same LBA corresponding to the single LBA. Further, as shown in FIG. 3, a single command (e.g., command 2) having multiple disjoint LBA ranges may be divided into multiple entries of the LBA range table 120, such that each disjoint LBA range for the same command has its own entry in the LBA range table 120.

Referring again to FIG. 2, in some embodiments, the command pipeline circuit 112 and/or the storage controller 114 may transmit overlap check requests to the LOC circuit 122. For example, the select circuit 202 may receive the overlap check requests from the command pipeline circuit 112 and/or the storage controller 114. The select circuit 202 may select a suitable one of the overlap check requests as an active request, such that the LOC circuit checks whether one or more LBA ranges associated with the active request overlaps with one or more LBA ranges loaded from the LBA range table 120. For example, in some embodiments, the select circuit 202 may pool a plurality of overlap check requests received from the command pipeline circuit 112 and/or the storage controller 114, and may select a suitable or a desirable overlap check request from the pool according to a suitable selection logic. For example, the select circuit 202 may select the active request from among the overlap check requests received from the command pipeline circuit 112 and/or the storage controller 114 according to a first in-first out algorithm, a last in-last out algorithm, a weighted round-robin algorithm, a command type associated with the request, a command priority associated with the request, a priority associated with a source of the request (e.g., the storage controller 114 may be given higher priority), a particular LBA range associated with the request, and/or the like. However, the present disclosure is not limited thereto, and in some embodiments, the select circuit 202 may be omitted. For example, in some embodiments, the LOC circuit 122 may handle overlap check requests in an order in which they are received, and in this case, the select circuit 202 may be omitted.

In some embodiments, different types of commands with overlapping ranges may be handled differently depending on, for example, atomicity requirements. For example, a READ command that overlaps another READ command may be handled differently than a READ command that overlaps a WRITE command, as those commands that modify the state of the logical blocks may affect atomicity. In this case, for example, the command pipeline circuit 112 and/or the storage controller 114 may transmit the overlap check requests to the LOC circuit 122 according to (e.g., depending on) a type of the command, and/or the select circuit 202 may select the active request according to (e.g., depending on) a type of the command. However, the present disclosure is not limited thereto.

In some embodiments, the LOC circuit 122 may fetch (e.g., may read or retrieve) an LBA range associated with the active request from the LBA range table 120, and may load the LBA range into an internal table (e.g., an internal register of flip-flops and/or the like) of the LOC circuit 122 to be compared with one or more LBA ranges of one or more pending commands. For example, in some embodiments, the active request may include an index, a pointer, and/or the like into the LBA range table 120 of the storage memory 116, specifying the LBA range associated with the active request to be fetched. In some embodiments, the fetch circuit 204 may include the internal table to store the one or more LBA ranges of the one or more pending commands, which may be compared with the LBA range associated with the active request.

In some embodiments, the LBA ranges of the pending commands may correspond to previous active requests that have already been checked for overlap, and thus, may have been previously loaded into the internal table of the fetch circuit 204. In this case, when execution of a pending command from among the pending commands is completed, the pending command may be cleared (e.g., may be removed or deleted) from the internal table, such that the LBA range of the pending command is not compared with, and used to block, a subsequent active request. However, the present disclosure is not limited thereto, and in another embodiment, the fetch circuit 204 may fetch (e.g., may read or may retrieve) the LBA range associated with the active request from the LBA range table 120, as well as the LBA ranges of the pending commands for comparison, each time a new active request is received. In this case, when execution of a pending command from among the pending commands is completed, the storage controller 114 and/or the command pipeline circuit 112 may clear (e.g., may remove or may delete) the pending command from the LBA range table 120, such that the LBA range of the pending command is not fetched and compared with the LBA range of the active request under consideration.

In some embodiments, as discussed in more detail below with reference to FIG. 4, the LOC circuit 122 may compare the LBA range associated with the active request with one or more of the LBA ranges of the pending commands, to determine whether or not there is an overlap therebetween. For example, the check circuit 206 may compare the LBA range of the active request with each of the LBA ranges of the pending commands (e.g., fetched from the LBA range table 120) to determine whether the LBA range of the active request overlaps with any of those of the pending commands. In some embodiments, if the LBA range of the active request does not overlap with any of those of the pending commands, a notification may be provided to an originator (e.g., to the storage controller 114 and/or the command pipeline circuit 112) of the overlap check request associated with the active request, such that the command associated with the active request may be executed (e.g., immediately executed or proceed to execution). In this case, in some embodiments, the originator (e.g., the storage controller 114 and/or the command pipeline circuit 112) may provide a response to the host device 102, indicating that the command was successfully executed. On the other hand, if the LBA range of the active request overlaps with any of the LBA ranges of the pending commands, no notification may be provided to the originator, such that the command associated with the active request may be blocked. In this case, in some embodiments, the check circuit 206 may generate an overlap count to determine an execution order sequence of the command associated with the active request.

Figure 4:
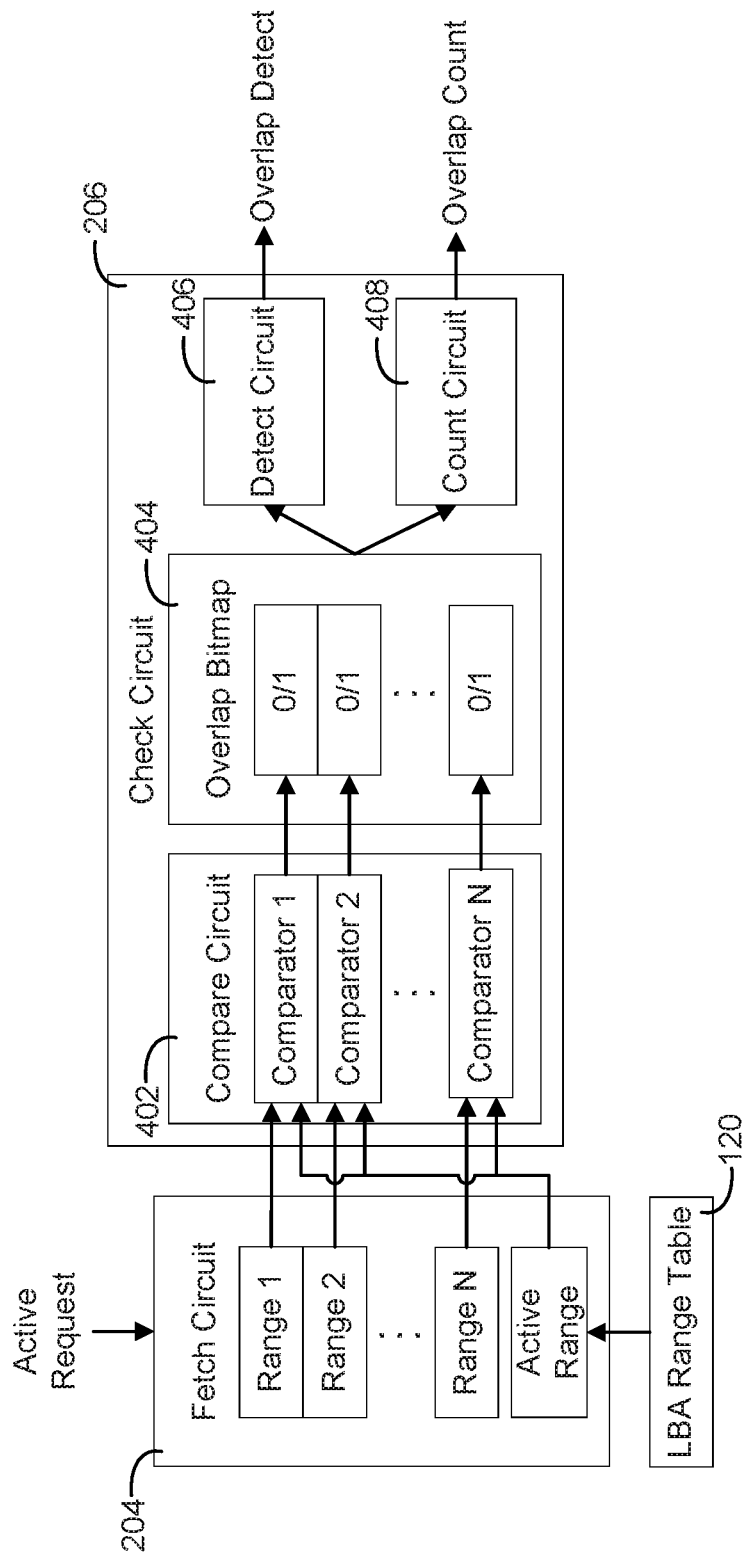
FIG. 4 is a block diagram of a check circuit of an LOC circuit, according to one or more example embodiments of the present disclosure.

FIG. 4 is a block diagram of a check circuit of an LOC circuit, according to one or more example embodiments of the present disclosure.

In brief overview, the fetch circuit 204 may receive an active request corresponding to an overlap check request received from the storage controller 114 or the command pipeline circuit 112 (e.g., via the select circuit 202). In some embodiments, the active request may include an index, a pointer, and/or the like specifying a location of one or more LBA ranges associated with the active request in the LBA range table 120. In some embodiments, the fetch circuit 204 may fetch (e.g., may read or may retrieve) the one or more LBA ranges associated with the active request (e.g., an Active Range) from the LBA range table 120, and may load one or more of the Active Ranges associated with the active request in an internal table (e.g., an internal register of flip-flops and/or the like). The fetch circuit 204 may provide the one or more Active Ranges associated with the active request to the check circuit 206, as well as LBA ranges Range 1 to Range N (where N is a natural number) associated with one or more pending commands (e.g., associated with the commands in progress of execution, or blocked and waiting to be executed), and the check circuit 206 may check for overlaps therebetween. For example, in some embodiments, the check circuit 206 may include a compare circuit 402, an overlap bitmap 404, a detect circuit 406, and a count circuit 408.

In more detail, referring to FIG. 4, in some embodiments, the compare circuit 402 may include a plurality of comparators Comparator 1 to Comparator N. Each of the comparators Comparator 1 to Comparator N may receive the Active Range (e.g., the LBA range associated with the active request) for comparison with a corresponding one of the LBA ranges Range 1 to Range N associated with one or more pending commands. For example, a first comparator Comparator 1 may compare the Active Range with a first LBA range Range 1 from among the one or more pending commands, a second comparator Comparator 2 may compare the Active Range with a second LBA range Range 2 from among the one or more pending commands, and so on and so forth, such that an N-th comparator Comparator N may compare the Active Range with an N-th (e.g., a last) LBA range Range N of the one or more pending commands. In some embodiments, the comparators Comparator 1 to Comparator N may perform the comparisons concurrently (e.g., simultaneously or at the same time) as each other, but the present disclosure is not limited thereto.

In some embodiments, each of the comparators Comparator 1 to Comparator N may output a comparison result, indicating whether the Active Range (e.g., the LBA range of the active request) overlaps with a corresponding LBA range Range 1 to Range N of the one or more pending commands. In some embodiments, the comparison results of the comparators Comparator 1 to Comparator N may be used to generate an overlap bitmap 404. For example, in an embodiment, if the Active Range overlaps with the corresponding LBA range Range 1 to Range N of the one or more pending commands, the corresponding comparator Comparator 1 to Comparator N may set a corresponding bit (0/1) in the overlap bitmap 404 to an overlap level (e.g., a high-level). On the other hand, if the Active Range does not overlap with the corresponding LBA range Range 1 to Range N of the one or more pending commands, the corresponding comparator Comparator 1 to Comparator N may set the corresponding bit (0/1) in the overlap bitmap 404 to a non-overlap level (e.g., a low-level).

In some embodiments, the detect circuit 406 may detect an overlap according to the comparison results of the compare circuit 402. For example, in some embodiments, the detect circuit 406 may output an overlap detect signal according to the overlap bitmap 404. In this case, if any of the bits (0/1) in the overlap bitmap 404 are set to the overlap level (e.g., the high-level), an overlap signal (e.g., a high-level signal) may be output as the overlap detect signal, indicating that the Active Range of the active request overlaps with at least one of the LBA ranges Range 1 to Range N of the pending commands. On the other hand, if each of the bits (0/1) in the overlap bitmap 404 are set to the non-overlap level (e.g., the low-level), a valid signal (e.g., a low-level signal) may be output as the overlap detect signal, indicating that the Active Range of the active request does not overlap with any of the LBA ranges Range 1 to Range N of the pending commands.

Figure 5:
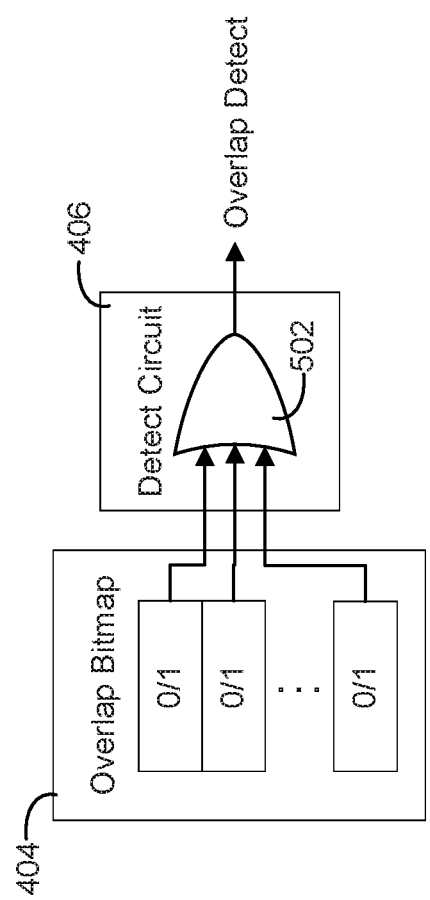
FIG. 5 is a schematic circuit diagram illustrating a detect circuit of the check circuit, according to one or more example embodiments of the present disclosure.

For example, referring to FIG. 5, a schematic circuit diagram illustrating the detect circuit 406 is shown, according to one or more example embodiments of the present disclosure. As shown in FIG. 5, in some embodiments, the detect circuit 406 may include one or more logic gates. For example, the detect circuit 406 may include an OR logic gate 502. In this case, the OR logic gate 502 may determine whether at least one of the bits (0/1) in the overlap bitmap 404 are set to the overlap level (e.g., the high-level), and if at least one of the bits (0/1) has the overlap level (e.g., the high-level), the OR logic gate 502 may output the overlap signal (e.g., the high-level signal) as the overlap detect signal. On the other hand, if each of the bits (0/1) in the overlap bitmap 404 are set to the non-overlap level (e.g., the low-level), the OR logic gate 502 may output the valid signal (e.g., the low-level signal) as the overlap detect signal. However, the present disclosure is not limited thereto, and the detect circuit 406 may be variously modified according to the spirit and scope of the present disclosure. For example, the detect circuit 406 may include (e.g., may be implemented with) various suitable hardware structures, electronic elements, and/or components, for example, such as other various suitable logic gates (e.g., NAND gates, NOR gates, XOR gates, NOT gates, EXOR gates, EXNOR gates, and/or the like), various suitable switches, various suitable transistors, various suitable resistors, various suitable capacitors, and/or the like, as would be known to those skilled in the art according to the content of the present disclosure, and/or learned from practicing one or more embodiments of the present disclosure.

In some embodiments, the compare circuit 402 may enable execution of a command having multiple disjoint LBA ranges, even when one or more LBA ranges from among the multiple disjoint LBA ranges is blocked. For an illustrative example, consider a command having two disjoint LBA ranges, such that the two disjoint LBA ranges do not overlap with each other, and assume that a first LBA range from among the two disjoint LBA ranges overlaps with one or more of those of the pending commands and a second LBA range from among the two disjoint LBA ranges does not overlap with any of those of the pending commands. In this case, if the first LBA range is checked first, the first LBA range may be blocked for overlapping with one or more LBA ranges of the pending commands. However, when the second LBA range for the same command is subsequently checked for overlap, the second LBA range for the command may proceed to execution, even if the first LBA range for the same command is blocked, because the second LBA range does not overlap with the first LBA range or any of those of the pending commands. Accordingly, performance may be improved.

Referring again to FIG. 4, in some embodiments, the count circuit 408 may track an overlap count to maintain an execution order sequence of commands having overlapping LBA ranges. For example, as will be described in more detail with reference to FIG. 6 below, in some embodiments, the count circuit 408 may track a number of overlapping ranges between the Active Range of the active request under consideration and the LBA ranges of the pending commands, and may generate an overlap count corresponding to the number of overlapping ranges. In this case, the overlap count may be used to determine an order in which the command corresponding to the active request may be executed. After execution of one of the pending commands with the overlapping range is completed, the overlap count of a corresponding request may be decremented, such that the execution order sequence of the corresponding request may be maintained. In this case, when the overlap count of the corresponding request is decremented to 0, the command associated with corresponding request may be next to be executed from among the pending commands having the same overlapping ranges.

Figure 6:
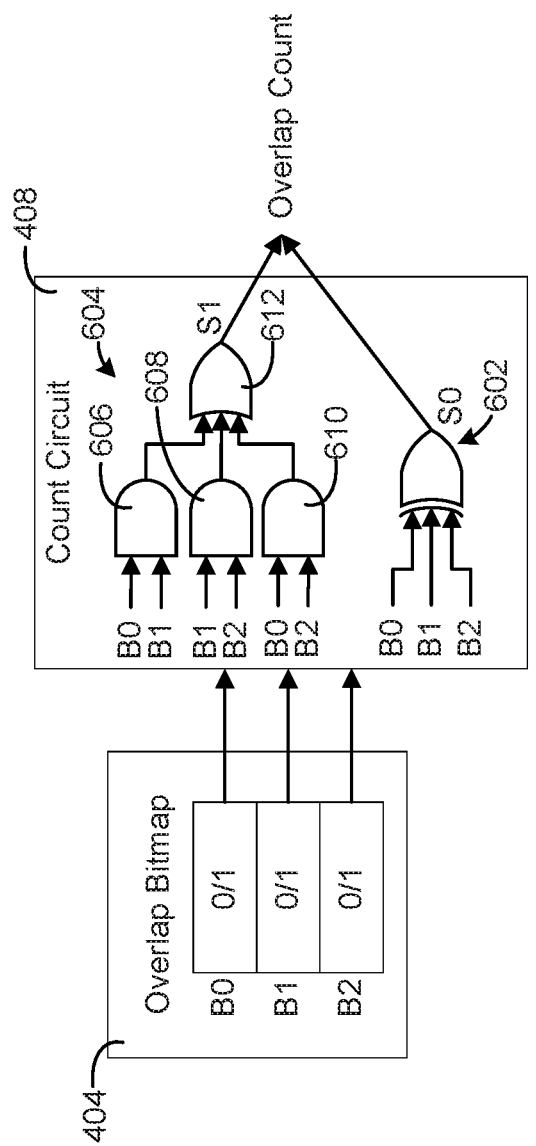
FIG. 6 is a schematic circuit diagram illustrating a count circuit of the check circuit, according to one or more example embodiments of the present disclosure.

FIG. 6 is a schematic circuit diagram illustrating a count circuit of the check circuit, according to one or more example embodiments of the present disclosure. For convenience, the count circuit 408 is shown for a 3-bit overlap bitmap 404 in FIG. 6, but the present disclosure is not limited thereto.

Referring to FIG. 6, in some embodiments, the count circuit 408 for a 3-bit bitmap 404 may generate the overlap count according to a binary count of a plurality of count bits. For example, for the illustrative 3-bit overlap bitmap 404, the count circuit 408 may generate the overlap count according to a first count bit (e.g., a least significant bit) S0 and a second count bit (e.g., a more significant bit or a most significant bit in this illustrative 3-bit example) S1. However, the present disclosure is not limited thereto, and a person having ordinary skill in the art will appreciate that the count circuit 408 may generate the overlap count according to more or less count bits depending on a number of bits of the bitmap 404. In some embodiments, the count circuit 408 may include one or more logic circuits having different circuit structures from each other to generate the overlap count according to the plurality of bits S0 and S1. For example, the count circuit 408 may include a first logic circuit 602 to generate a bit value for the first count bit S0, and a second logic circuit 604 to generate a bit value for the second count bit S1.

In this example, the first logic circuit 602 may output the first count bit S0 depending on whether one of the bits B0, B1, and B2, or all of the bits B0, B1, and B2, of the overlap bitmap 404 is/are set to have the overlap level (e.g., the high-level). The second logic circuit 604 may output the second count bit S1 depending on whether at least two of the bits B0, B1, and B2 are set to have the overlap level (e.g., the high-level). Accordingly, in some embodiments, the first logic circuit 602 may have a circuit structure that is different from that of the second logic circuit 604. For example, in an embodiment, the first logic circuit 602 may include (e.g., may be implemented with) a first logic gate, and the second logic circuit 604 may include (e.g., may be implemented with) a plurality of second logic gates 606, 608, and 610, and a third logic gate 612.

The first logic gate of the first logic circuit 602 may output the first count bit S0 to have the bit value depending on whether any one of, or all of, the bits B0, B1, and B2 of the overlap bitmap 404 has the overlap level (e.g., the high-level). For example, in an embodiment, the first logic gate of the first logic circuit 602 may be implemented as an XOR gate, such that if any one of the bits B0, B1, and B2, or if all of the bits B0, B1, and B2, of the overlap bitmap 404 has the overlap level (e.g., the high-level), the first logic circuit 602 outputs the first count bit S0 to have a high-level (e.g., 1). Otherwise, the first logic circuit 602 outputs the first count bit S0 to have a low-level (e.g., 0).

The second logic circuit 604 may include (e.g., may be implemented with) the plurality of second logic gates 606, 608, and 610, and the third logic gate 612. Each of the plurality of second logic gates 606, 608, and 610 may determine whether two corresponding ones of the bits from among the bits B0, B1, and B2 of the overlap bitmap 404 have the overlap level (e.g., the high-level), and the third logic gate 612 may output the second count bit S1 according to the outputs of the second logic gates 606, 608, and 610. For example, in an embodiment, each of the second logic gates 606, 608, and 610 may be implemented as an AND gate, and the third logic gate 612 may be implemented as an OR gate. In this case, each of the second logic gates 606, 608, and 610 may perform an AND operation on a different set of the bits B0, B1, and B2 of the overlap bitmap 404. For example, a first-second logic gate 606 may perform an AND operation between a first bit B0 and a second bit B1 from among the bits B0, B1, and B2 of the overlap bitmap 404, a second-second logic gate 608 may perform an AND operation between the second bit B1 and a third bit B2 from among the bits B0, B1, and B2 of the overlap bitmap 404, and a third-second logic gate 610 may perform an AND operation between the first bit B0 and the third bit B2 from among the bits B0, B1, and B2 of the overlap bitmap 404. The third logic gate 612 may output the second count bit S1 to have a high-level value if any one or more of the second logic gates 606, 608, and 610 determines that their corresponding two bits from among the bits B0, B1, and B2 of the overlap bitmap 404 have the overlap level (e.g., the high-level). Otherwise, the third logic gate 612 may output the second count bit S1 to have a low-level (e.g., 0).

For an illustrative example, consider 4 overlapping LBA ranges that are sequentially submitted for an overlap check, and assume that a first LBA range from among the 4 overlapping LBA ranges does not overlap with any of the currently pending commands. In this case, when the first LBA range is checked, the count circuit 408 may output an overlap count of 0 (e.g., S0=0, S1=0, and the like) indicating no overlaps, such that the first LBA range may proceed to execution. When a second LBA range from among the 4 overlapping LBA ranges is checked, the first LBA range may now be loaded by the fetch circuit 204 as one of the LBA ranges of the pending commands (e.g., as in-progress of being executed), such that the second LBA range overlaps with the first LBA range. In this case, the count circuit 408 outputs the overlap count to have a value of 1 (e.g., S0=1 and S1=0), indicating that the second LBA range overlaps with one of the LBA ranges of the pending commands (e.g., the first LBA range).

Similarly, when a third LBA range from among the 4 overlapping LBA ranges is checked, the second LBA range may be loaded by the fetch circuit 204 as one of the LBA ranges of the pending commands (e.g., as blocked and waiting to be executed), such that the third LBA range overlaps with the first LBA range and the second LBA range.

In this case, the count circuit 408 outputs the overlap count to have a value of 2 (e.g., S0=0 and S1=1), indicating that the third LBA range overlaps with two of the LBA ranges of the pending commands (e.g., the first LBA range and the second LBA range). Further, when a fourth LBA range from among the 4 overlapping LBA ranges is checked, the third LBA range may be loaded by the fetch circuit 204 as one of the LBA ranges of the pending commands (e.g., as blocked and waiting to be executed), such that the fourth LBA range overlaps with the first LBA range, the second LBA range, and the third LBA range. In this case, the count circuit 408 outputs the overlap count to have a value of 3 (e.g., S0=1 and S1=1), indicating that the fourth LBA range overlaps with three of the LBA ranges of the pending commands (e.g., the first LBA range, the second LBA range, and the third LBA range).

In this illustrative example, as the command for each of the first, second, third, and fourth LBA ranges is completed (e.g., successfully executed and/or response provided to the host device 102), the overlap count for each of the remaining ones with overlapping ranges may be decremented. Once the overlap count thereof is decremented to 0, the corresponding command may be unblocked, such that the corresponding command may proceed to execution. For example, when the command for the first LBA range is successfully executed, the overlap count for the second LBA range may be decremented from 1 to 0, the overlap count for the third LBA range may be decremented from 2 to 1, and the overlap count for the third LBA range may be decremented from 3 to 2. In this case, the command for the second LBA range may be unblocked, such that it may proceed to execution, and upon successful execution thereof, the overlap counts for each of the remaining third and fourth overlapping LBA ranges may be decremented. Because the overlap count for the third LBA range is decremented to 0, the command for the third LBA range may be unblocked to proceed to execution, and upon successful execution thereof, the overlap count for the fourth LBA range may be decremented to 0, the fourth LBA range may be unblocked in response thereof, and the command associated with the fourth LBA range may proceed to execution.

Figure 7:
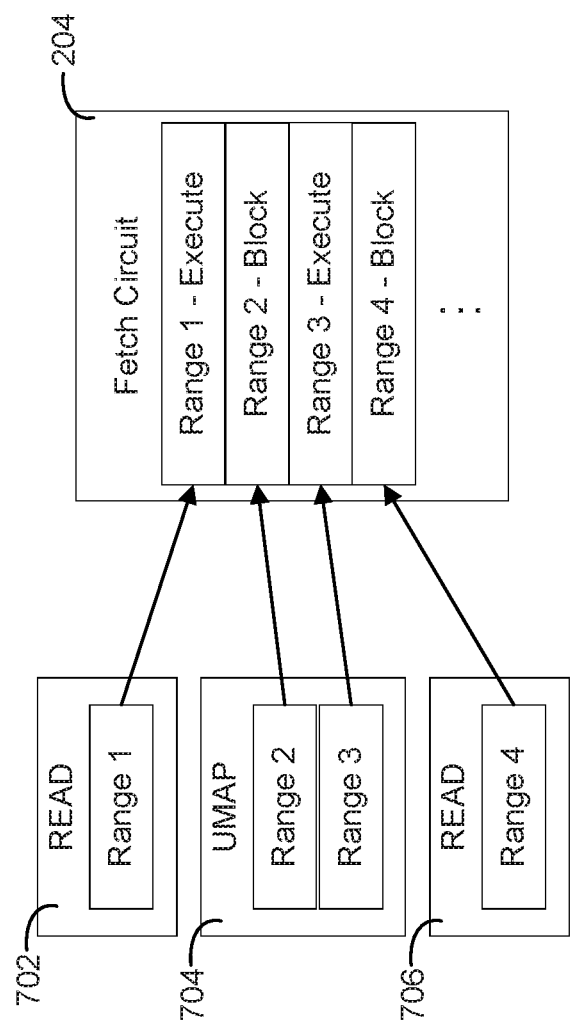
FIG. 7 is a flow diagram of an illustrative example of blocking commands with overlapping ranges, according to one or more example embodiments of the present disclosure.

FIG. 7 is a flow diagram of an illustrative example of blocking commands with overlapping ranges, according to one or more example embodiments of the present disclosure.

Referring to FIG. 7, a first active request 702 corresponding to a first command (e.g., a READ command) may be received by the fetch circuit 204 of the LOC circuit 122. For example, the first active request may correspond to a first LBA range Range 1. The fetch circuit 204 may fetch (e.g., may read or may retrieve) the first LBA range Range 1 from the storage memory 116 (e.g., from the LBA range table 120), and may load the first LBA range into the internal table (e.g., the internal register of flip flops) of the fetch circuit 204 for comparison. In this illustrative example, the first LBA range may not overlap with any other ranges, and thus, the first LBA range may proceed to execution.

While the first command for the first LBA range is pending (e.g., in progress of being executed), the fetch circuit 204 may receive a second active request 704 corresponding to a second command (e.g., an UNMAP command). The second active request 704 may correspond to a second LBA range Range 2 and a third LBA range Range 3. For example, the second LBA range Range 2 and the third LBA range Range 3 may be disjoint LBA ranges of the same second command that do not overlap with each other. In this case, the fetch circuit 204 may fetch (e.g., may read or may retrieve) each of the first and second LBA ranges Range 2 and Range 3 from the storage memory 116 (e.g., from the LBA range table 120), and may concurrently (e.g., simultaneously or at the same time) load the first and second LBA ranges Range 2 and Range 3 into the internal table.

In this illustrative example, the second LBA range Range 2 may overlap with the first LBA range Range 1, and thus, the second LBA range Range 2 for the second command may be blocked. For example, the overlap count associated with the second LBA range Range 2 may be set (e.g., by the count circuit 408) such that the second LBA range Range 2 is blocked. On the other hand, the third LBA range Range 3 may not overlap with any other ranges, and thus, may proceed to execution, even though the second LBA range Range 2 for the same command is blocked. The overlap count of the second LBA range Range 2 may be decremented when the first command associated with the first LBA range Range 1 is completed, and once the overlap count for the second LBA range Range 2 is decremented to 0, the second LBA range Range 2 may be unblocked to proceed to execution.

Still referring to FIG. 7, while the second command for the third LBA range Range 3 is pending (e.g., in progress of being executed), the fetch circuit 204 may receive a third active request 706 corresponding to a third command (e.g., a READ command). The third active request 706 may correspond to a fourth LBA range Range 4. In this case, the fetch circuit 204 may fetch (e.g., may read or may retrieve) the fourth LBA range Range 4 from the storage memory 116 (e.g., from the LBA range table 120), and may load the fourth LBA range Range 4 into the internal table. The fourth LBA range Range 4 may overlap with the third LBA range Range 3, and thus, may be blocked. For example, the overlap count associated with the fourth LBA range Range 4 may be set (e.g., by the count circuit 408) such that the fourth LBA range Range 4 is blocked. The overlap count of the fourth LBA range Range 4 may be decremented when the second command associated with the third LBA range Range 3 is completed, and once the overlap count for the fourth LBA range Range 4 is decremented to 0, the fourth LBA range Range 4 may be unblocked to proceed to execution. In this case, the fourth LBA range Range 4 may be unblocked to proceed to execution when a portion of the second command corresponding to the third LBA range Range 3 is completed, even if the second command itself (e.g., the second command 704 for both the second range Range 2 and the third range Range 3) is not completed.

As discussed above, according to one or more example embodiments of the present disclosure, a storage device includes the LOC circuit 122 to enable overlap checking of multiple LBAs or LBA ranges concurrently (e.g., simultaneously or at the same time). In some embodiments, the LOC circuit 122 may block execution of commands having overlapping LBAs or LBA ranges, while allowing execution of commands (e.g., the same command and/or subsequent commands) that do not have overlapping LBAs or LBA ranges. Accordingly, performance of the storage device may be improved.

In the drawings, the relative sizes of elements, layers, and regions may be exaggerated and/or simplified for clarity. It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has, " "have, " and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device comprising:
   one or more logical blocks configured to store host data received from a host device, the logical blocks having a logical block address (LBA);
   an LBA range table configured to store one or more LBA ranges associated with one or more commands received from the host device over a storage interface; and
   an overlap check circuit configured to compare an LBA range associated with an active request with the one or more LBA ranges associated with the one or more commands, and to determine an overlap between the LBA range associated with the active request and any of the one or more LBA ranges associated with the one or more commands to block execution of a command associated with the active request in response to determining that the LBA range associated with the active request overlaps with at least one of the one or more LBA ranges associated with the one or more commands,
   wherein the overlap check circuit is configured to:
   generate an overlap bitmap according to a comparison result between the LBA range associated with the active request and the one or more LBA ranges stored in the LBA range table; and
   set an overlap count value for the LBA range associated with the active request corresponding to a number of overlaps between the LBA range associated with the active request and the one or more LBA ranges associated with the one or more commands, the overlap count value being determined according to a logical operation result between at least two bits of the overlap bitmap.

2. The storage device of claim 1, wherein the overlap check circuit is configured to allow execution of the command associated with the active request in response to determining that the LBA range associated with the active request does not overlap with any of the one or more LBA ranges associated with the one or more commands.

3. The storage device of claim 2, wherein the one or more commands correspond to a pending command that is blocked by the overlap check circuit for having an overlapping LBA range, or that is in-progress of being executed.

4. The storage device of claim 1, wherein the active request corresponds to an incoming command received from the host device over the storage interface, and the LBA range associated with the active request comprises disjoint LBA ranges of the incoming command.

5. The storage device of claim 4, wherein the overlap check circuit is configured to block execution of the incoming command for at least a first LBA range from among the disjoint LBA ranges, and to allow execution of the incoming command for at least a second LBA range from among the disjoint LBA ranges for the same incoming command.

6. The storage device of claim 1, wherein the overlap check circuit comprises one or more comparators configured to compare the LBA range associated with the active request with the one or more LBA ranges associated with the one or more commands, and each of the comparators is configured to compare the LBA range associated with the active request with a different one of the one or more LBA ranges associated with the one or more commands.

7. The storage device of claim 1, wherein the overlap check circuit is configured to maintain an execution order sequence of commands having overlapping LBA ranges.

8. The storage device of claim 1, wherein the overlap check circuit is configured to decrement the overlap count value in response to an execution completion of a command from among the one or more commands having an overlapping LBA range with the LBA range associated with the active request, and to allow execution of the LBA range associated with the active request in response to the overlap count value being decremented to a threshold.

9. The storage device of claim 1, wherein the LBA range associated with the active request is registered to the LBA range table, and the overlap check circuit is configured to retrieve the LBA range associated with the active request from the LBA range table.

10. A method for checking overlaps in a logical block address (LBA) associated with a command issued by a host device to a storage device, the method comprising:
    storing, by an LBA range table, one or more LBA ranges associated with one or more commands received from the host device over a storage interface;
    comparing, by an overlap check circuit of the storage device, an LBA range associated with an active request with the one or more LBA ranges associated with the one or more commands;
    determining, by the overlap check circuit, an overlap between the LBA range associated with the active request and any of the one or more LBA ranges associated with the one or more commands; and
    blocking, by the overlap check circuit, execution of a command associated with the active request in response to determining that the LBA range associated with the active request overlaps with at least one of the one or more LBA ranges associated with the one or more commands,
    wherein the determining comprises:
        generating, by the overlap check circuit, an overlap bitmap according to a comparison result between the LBA range associated with the active request and the one or more LBA ranges stored in the LBA range table; and
        setting, by the overlap check circuit, an overlap count value for the LBA range associated with the active request corresponding to a number of overlaps between the LBA range associated with the active request and the one or more LBA ranges associated with the one or more commands, the overlap count value being determined according to a logical operation result between at least two bits of the overlap bitmap.

11. The method of claim 10, further comprising:
    allowing, by the overlap check circuit, execution of the command associated with the active request in response to determining that the LBA range associated with the active request does not overlap with any of the one or more LBA ranges associated with the one or more commands.

12. The method of claim 11, wherein the one or more commands corresponds to a pending command that is blocked by the overlap check circuit for having an overlapping LBA range, or that is in-progress of being executed.

13. The method of claim 10, wherein the active request corresponds to an incoming command received from the host device over the storage interface, and the LBA range associated with the active request comprises disjoint LBA ranges of the incoming command.

14. The method of claim 13, further comprising:
    blocking, by the overlap check circuit, execution of the incoming command for at least a first LBA range from among the disjoint LBA ranges; and
    allowing, by the overlap check circuit, execution of the incoming command for at least a second LBA range from among the disjoint LBA ranges for the same incoming command.

15. The method of claim 10, wherein the overlap check circuit comprises one or more comparators, and the method further comprises:
    comparing, by the comparators, the LBA range associated with the active request with the one or more LBA ranges associated with the one or more commands,
    wherein each of the comparators compares the LBA range associated with the active request with a different one of the one or more LBA ranges associated with the one or more commands.

16. The method of claim 10, further comprising:
    maintaining, by the overlap check circuit, an execution order sequence of commands having overlapping LBA ranges.

17. The method of claim 10, further comprising:
    decrementing, by the overlap check circuit, the overlap count value in response to an execution completion of a command from among the one or more commands having an overlapping LBA range with the LBA range associated with the active request; and
    allowing, by the overlap check circuit, execution of the LBA range associated with the active request in response to the overlap count value being decremented to a threshold.

18. The method of claim 10, wherein the LBA range associated with the active request is registered to the LBA range table, and the method further comprises:
    retrieving, by the overlap check circuit, the LBA range associated with the active request from the LBA range table.

* * * * *